US007860073B2

(12) United States Patent  
Chen (10) Patent No.: US 7,860,073 B2  
(45) Date of Patent: Dec. 28, 2010

(54) TUNNELING INTERNET PROTOCOL PACKETS BETWEEN A GATEWAY SUPPORT NODE AND A MOBILE TERMINAL (75) Inventor: Xiaobao Chen, Swindon (GB)

(73) Assignee: Orange S.A., Paris (FR)

( * ) Notice: Subject to any disclaimer, the term of this patent is extended or adjusted under 35 U.S.C. 154(b) by 334 days.

(21) Appl. No.: 11/658,778

(22) PCT Filed: Jun. 10, 2005

(86) PCT No.: PCT/GB2005/002313

§ 371 (c)(1),
(2), (4) Date: Nov. 28, 2008

(87) PCT Pub. No.: WO2006/010876

PCT Pub. Date: Feb. 2, 2006

(65) Prior Publication Data

US 2009/0073919 A1 Mar. 19, 2009

(30) Foreign Application Priority Data

Jul. 30, 2004 (GB) ................................ 0417117.9

(51) Int. Cl.
*H04W 4/00* (2009.01)
*H04L 12/28* (2006.01)
*H04J 3/16* (2006.01)
(52) U.S. Cl. ...................... 370/338; 370/392; 370/469
(58) Field of Classification Search .................. None
See application file for complete search history.

(56) References Cited

U.S. PATENT DOCUMENTS

| 7,554,991 | B2* | 6/2009 | Sbida ....................... 370/395.5 |
| 2001/0017856 | A1 | 8/2001 | Asokan et al. .............. 370/389 |
| 2007/0258399 | A1* | 11/2007 | Chen ........................... 370/328 |

FOREIGN PATENT DOCUMENTS

WO   WO 01/93540 A1   12/2001

(Continued)

OTHER PUBLICATIONS

Transition Mechanisms for IPv6 Hosts and Routers, FreeGate Corp., Sun Microsystems, Inc., Aug. 2000, Network Working Group, pp. 1-27, http://www.ietf.org/rfc/rfc2893.txt?number=2893.

(Continued)

*Primary Examiner*—Nittaya Juntima
(74) *Attorney, Agent, or Firm*—Haverstock & Owens LLP (57) ABSTRACT

A telecommunications system comprises a user equipment operable to request a bearer for communicating internet protocol data according to the second internet protocol (IPv4) to and from a gateway support node of a packet radio network. The gateway support node is operable to establish a tunnelling protocol bearer for communicating the internet packet data to and from the user equipment across the packet data network. The user equipment is operable in combination with the gateway support node to form a link local address. The link local address comprises an interface identifier including a tunnelling end identifier of the tunnelling protocol bearer which ends at a gateway support node of the core network part of the packet radio network. An internet protocol address according to the first internet protocol is requested from an address allocation server using the link local address. The user equipment is operable in combination with the gateway support node to receive an allocated internet protocol address according to the first internet protocol, and to communicate with the user equipment using the allocated internet protocol address.

Embodiments of the present invention provide a facility for generating a link local address, which can be routed according to the first internet protocol to a server. As such the link local address can be used to acquire an internet protocol address from an address allocation server according to the first internet protocol. The acquired address can therefore be used to communicate internet protocol data, replacing the link local address with the acquired address of the user equipment.

29 Claims, 7 Drawing Sheets

FOREIGN PATENT DOCUMENTS

| WO | WO 03/019973 A3 | 3/2003 |
| --- | --- | --- |
| WO | WO 03/052961 A1 | 6/2003 |
| WO | WO 2004/006538 A1 | 1/2004 |
| WO | WO 2004/049668 A1 | 6/2004 |
| WO | WO 2004/107126 A2 | 12/2004 |

OTHER PUBLICATIONS

Network Address Translation—Protocol Translation (NAT-PT), G. Tsirtsis, BT, P. Srisuresh, Campio Communications, Feb. 2000, Network Working Group, Request for Comments: 2766, Category: Standards Track, http://www.ietf.org/rfc/rfc2766.txt?number-2766.

3GPP TS 26.202 V5.1.0 (Sep. 2002) Technical Specification, $3^{rd}$ Generation Partnership Project: Technical Specification Group Services and System Aspects; AMR wideband speech codec; Interface to Iu, Uu and Nb (Release 5) pp. 1-12.

3GPP TS 23.107 V6.1.0 (Mar. 2004) Technical Specification, $3^{rd}$ Generation Partnership Project; Technical Specification Group Services and System Aspects; Quality of Service (QoS) concept and architecture (Release 6) pp. 1-41.

3GPP TS 32.015 V3.12.0 (Dec. 2003) Technical Specification, $3^{rd}$ Generation Partnership Project; Technical Specification Group Services and System Aspects; Quality of Service (QoS) concept and architecture (Release 1999) pp. 1-65.

Neighbor Discovery for IP Version 6 (IPv6), T. Narten, IBM, E. Nordmark, Sun Microsystems, W. Simpson, Daydreamer, Dec. 1998, Network Working Group, Request for Comments: 2461; Obsoletes: 1970, Category: Standards Track; pp. 1-60 http://www.ietf.org/rfc/rfc2461.txt?number=2461.

Internet Protocol Version 6 (IPv6) Addressing Architecture, R. Hinden, Nokia, S. Deering, Cisco Systems, Apr. 2003, Network Working Group, Request for Comments: 3513; Obsoletes: 2373, Category: Standards Track; pp. 1-26 http://www.ietf.org/rfc/rfc3513.txt?number=3513.

Dynamic Host Configuration Protocol for IPv6 (DHCPv6), R. Droms, Ed., Cisco, J. Bound, Hewlett Packard, B. Volz, Ericsson, T.Lemon, Nominum, C. Perkins Nokia Research Center M. Carney, Sun Microsystems, Jul. 2003, http://www.ietf.org/rfc/rfc3315.txt?number=3315.

IPv6 Prefix Options for Dynamic Host Configuration Protocol (DHCP) version 6, O. Troan, R. Droms, Cisco Systems, Dec. 2003, Network Working Group, Request for Comments: 3633, Category: Standards Track,http://www.ietf.org/rfc/rfc3633.txt?number=3633.

Internet Protocol, Version 6 (IPv6), Specification, S. Deering, Cisco, R. Hinden, Nokia, Dec. 1998, Network Wroking Group, Request for Comments: 2460, Obsoletes: 1883, Category: Standards Track,http://www.ietf.org/rfc/rfc2460.txt?number=2460.

\* cited by examiner

Tunnel Endpoint Identifier Data I Information Element

Fig. 3a

Tunnel Endpoint Identifier Control Plane Information Element

Fig. 3b

| cccccc0gcccccccc (16bits) | cccccccc | Type (TEID) | 32 bits (TEID) |

GAT_ID_I: locally unique

Fig. 4a

| cccccc1gcccccccc (16bits) | cccccccc | Type (TEID) | 32 bits (TEID) |

GAT_ID_I: globally unique

Fig. 4b

| Prefix (8 octets) | GAT_ID_I (8 octets) |

Address for GTP automatic tunnelling

Fig. 5

| 10 bits | 54 | GAT_ID_I |

| 128 bits node address |
|---|

Fig. 9

| n bit subnet prefix | 128 - n bits interface ID |
|---|---|

Fig. 10

```
0           7 8         15 16        32
```
| ccccccug | ccccccc | ccccccc |
|---|---|---|

Fig. 11

| n bits global routing | m bits subset ID | 128-n-m bits Interface ID |
|---|---|---|

Fig. 12

| "0" (80 bits) | 0x00 | IPv4 Address |
|---|---|---|

Fig. 13

| "0" (80 bits) | 0xFF | IPv4 Address |
|---|---|---|

Fig. 14

| 10 bits | 54 bits subnet ID | 64 bits Interface ID |
|---|---|---|

Fig. 15

| 10 bits (1111111010) | 54 bits ("0") | 64 bits Interface ID |
|---|---|---|

TUNNELING INTERNET PROTOCOL PACKETS BETWEEN A GATEWAY SUPPORT NODE AND A MOBILE TERMINAL

FIELD OF THE INVENTION

The present invention relates to system and methods for communicating internet packet data via packet radio networks, such as, for example, a network operating in accordance with the General Packet Radio Service (GPRS).

BACKGROUND OF THE INVENTION

The GPRS has been developed to communicate internet packets via a radio access interface. A GPRS network can be formed using a Global System for Mobiles (GSM) or a Universal Mobile Telecommunications System (UMTS) backbone network. GPRS provides support for packet-orientated services and attempts to optimise network and radio resources for packet data communications such as for example Internet Protocol (IP). The GPRS provides a logical architecture, which is related to the circuit switched architecture of a mobile radio system.

The Internet Engineering Task Force (IETF) is a body which is responsible for developing internet protocols for facilitating communications via the internet. For example, a well established internet protocol is the internet protocol version 4 (IPv4) which has been developed and standardised for personal computers to access the internet. The IETF has also developed a further standard known as the internet protocol version 6 (IPv6) which provides an improvement with respect to the IPv4 in terms of facilitating mobile communications and increased addressing options for user equipment. Whilst there are similarities between IPv4 and IPv6, a packet radio network which has been established to support IPv4 will expect internet packets according to the IPv4 and not IPv6.

SUMMARY OF INVENTION

According to the present invention there is provided a telecommunications system for communicating internet packet data in accordance with a first internet protocol via a packet radio network operable in accordance a second internet protocol. The system comprises a user equipment operable to request a bearer for communicating internet protocol data according to the second internet protocol to and from a gateway support node of the packet radio network. The gateway support node is operable to establish a tunnelling protocol bearer for communicating the internet packet data to and from the user equipment across the packet radio network. The user equipment is operable in combination with the gateway support node to form a link local address. The link local address comprises an interface identifier including a tunnelling end identifier of the tunnelling protocol bearer which ends at a gateway support node of the core network part of the packet radio network. The link local address also includes an address component which identifies the address as being local to the packet radio network according to the first internet protocol. The user equipment is operable in combination with the gateway support node to communicate a request for an internet protocol address according to the first internet protocol to an address allocation server using the link local address. The user equipment is operable in combination with the gateway support node to receive an allocated internet protocol address according to the first internet protocol, and to communicate with the user equipment using the allocated internet protocol address.

Embodiments of the present invention provide a facility for generating a link local address which can be routed according to the first internet protocol to a server. As such the link local address can be used to acquire an internet protocol address from an address allocation server according to the first internet protocol. The acquired address can therefore be used to communicate internet protocol data, replacing the link local address with the acquired address of the user equipment.

The user equipment may be operable to inform the gateway support node that the internet packet data is to be communicated using the allocated address, source and destination addresses of the internet packet data being in accordance with the first internet protocol. The gateway support node may be operable to adapt a traffic flow template (TFT) to identify the established bearer from a source address of a correspondent node, which is in accordance with the first internet protocol address. As known by those skilled in the art, the traffic template flow (TFT) within the gateway support node performs a function of policing usage of resources on the packet radio network, and for routing received internet packets via an appropriate bearer. According to existing standards, for example, the GPRS standard as defined by the Third Generation Partnership Project (3GPP), the gateway support node is defined to have a TFT function. The TFT routes internet packet data to the user equipment via the packet radio network in accordance with a source address of the internet packet data received from a packet data network to which the packet radio network is connected. Existing GPRS networks, which are arranged to support internet protocol communications according to a second internet protocol, for example IPv4, will not recognise internet packet data according to the first internet protocol, for example IPv6. The first internet packets would therefore be dropped. This is because the bearer established by the gateway support node for communicating internet packets will be a bearer according to the second internet protocol. The TFT would therefore expect a second internet protocol address as a source address. Embodiments of the present invention include a modified gateway support node which can be instructed by the user equipment to adapt the TFT to accept a source address of a correspondent node, which is an internet protocol address according to the first internet protocol. The TFT can therefore route internet packet data to the user equipment using the source address of the correspondent node, which is an address according to the first internet protocol.

In some embodiments, the first internet protocol may be the Internet Protocol Version 6 (IPv6) and the second internet protocol may be the Internet Protocol Version 4 (IPv4).

Embodiments of the present invention can provide a facility for a user equipment to run application programs which require the use of IPv6 internet protocol communications to access services using a packet radio system network which has been arranged to communicate internet packets according to a different internet protocol (IPv4). The packet radio network may be for example a GPRS network.

Various further aspects and features of the present invention are defined in the appending claims with supporting embodiments described below.

BRIEF DESCRIPTION OF THE DRAWINGS

Embodiments of the present invention will now be described by way of example only with reference to the accompanying drawings where like parts are provided with corresponding reference numerals and in which.

DESCRIPTION OF THE EXAMPLE EMBODIMENTS

Embodiments described below provide mechanisms for supporting IPv6 traffic across IPv4 only GPRS/UMTS network. A 3 G operator is thereby able to support IPv6 network using their existing IPv4 only UMTS and thus risks associated with an early introduction of IPv6 IMS are minimised.

1. Example of a GPRS Network

Figure 1:
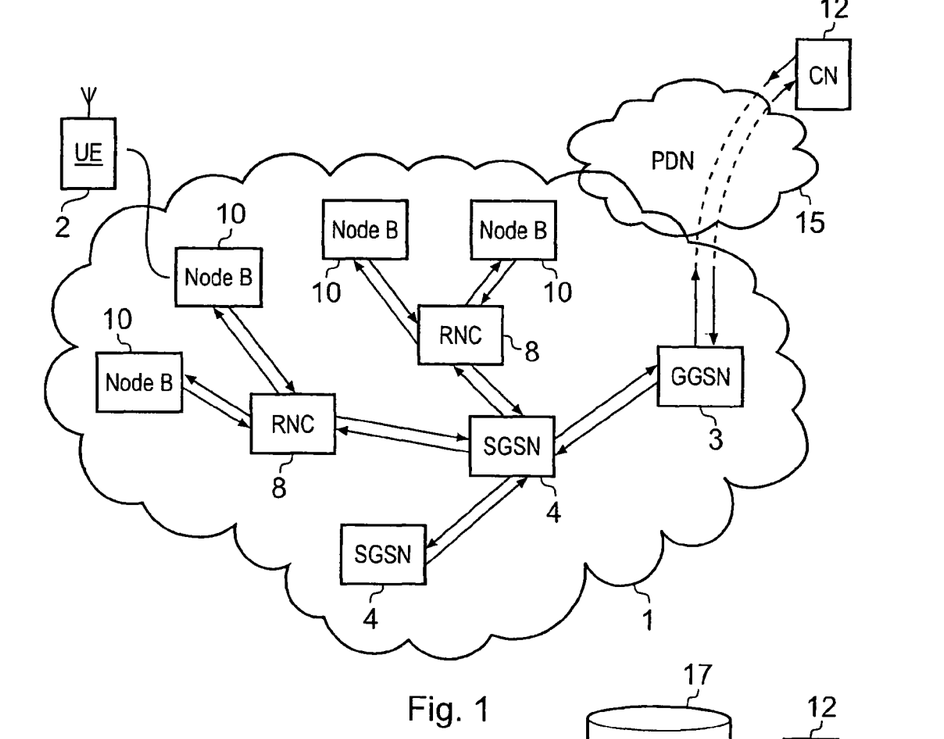
FIG. 1 is a schematic block diagram of a telecommunications system which includes a GPRS network.

FIG. 1 provides a schematic block diagram of a system for communicating internet packets according to a first (IPv6) internet protocol via a packet radio system network 1 which has been developed to support the communication of internet packets according to a second (IPv4) internet protocol standard. In FIG. 1 a user equipment (UE) 2, is arranged to host an application program providing, for example a multimedia service to a user. The application program may require, for example, access to an internet protocol multimedia sub-system (IMS) such as that developed by the 3GPP to provide multimedia services to users using a UMTS backbone network.

For the present example the packet radio system network 1 is a General Packet Radio Service (GPRS) network. For simplicity FIG. 1 shows elements of a GPRS network which are a GPRS Gateway Service Node (GGSN) 3, Serving GRPS Support Nodes (SGSN) 4, Radio Network Controllers (RNC) 8 and Node B elements 10.

The present technique concerns internet protocol communications between a correspondent node (CN) 12 and a UE 2 attached to the GPRS network 1. The CN 12 is shown in FIG. 1 as being attached to a Packet Data Network (PDN) 15, which is connected to the GPRS network. To communicate internet packet data between the CN and the UE a bearer is established across the GRPS network as illustrated in FIG. 2.

Figure 2:
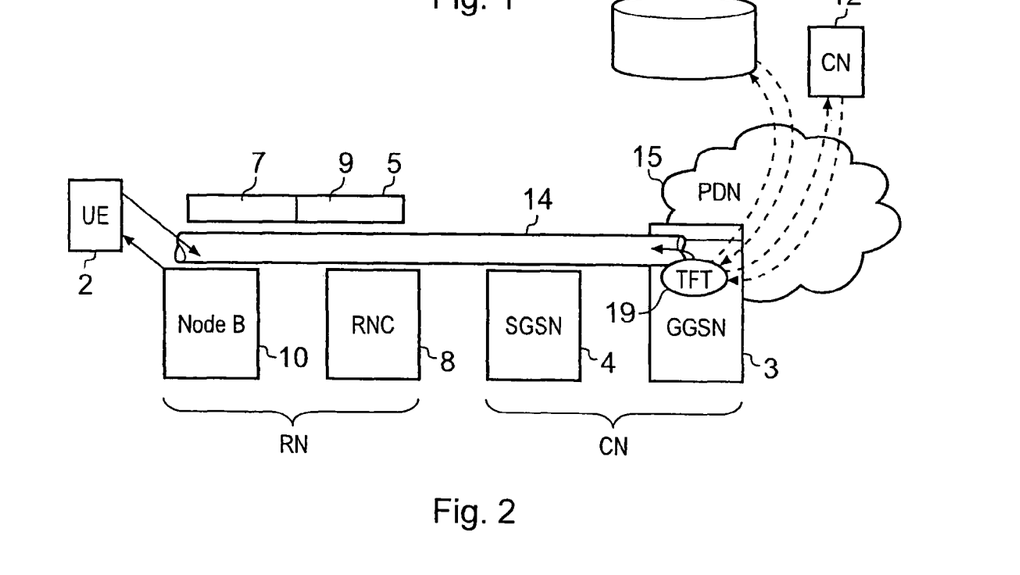
FIG. 2 is a schematic block diagram of parts of the GPRS network which form a tunnelling bear for communicating internet packets.

In FIG. 2, a bearer 14 is established between the GGSN 3 and the UE 2 for communicating internet packets 5, having a header 7 containing an address and payload data 9 to and from the UE 2 and the CN 12. Generally, the GGSN 4 and the SGSN 6 form parts of a core network, CN. For the core network, the bearer is formed by a GPRS Tunnelling Protocol (GTP) bearer. The radio network controller RNC 8 and the Node B 10 form part of a radio network RN. For the radio network RN, the bearer is formed from a Radio Access Bearer (RAB) tunnelling protocol bearer. The bearer is arranged to communicate internet packets 16 between the UE and the GGSN. The internet packets have an address 18 and a payload 20.

For the present example, the UE 2 is running an application program, which requires the support of, for example, IMS services. However, IMS has been developed and standardised in accordance with the IPv6 internet protocol standard, whereas the GPRS network 1 has been developed to support IPv4 internet protocol communications. As will be explained shortly, according to the present technique a bearer is established for the UTE 2 for conveying IPv6 internet packets via the GPRS network to the CN 12. To this end, the present technique is arranged to generate a link local address which can then be used to acquire via the bearer 14 an IPv6 address which can then be used to communicate internet packets via the GPRS network. As shown in FIG. 2, the IPv6 address is acquired from an address allocation server 17. The address allocation server 17 may be a DHCP server, which is a stateful address allocation server, known to those skilled in the art.

According to the present technique the UE informs the GGSN of the acquired address so that the GGSN can modify its operation to route internet packets in accordance with an IPv6 address. This is because a Traffic Flow Template (TFT) 19 which is responsible for routing the down-link internet packets (CN to UE) via the appropriate bearer by identifying the appropriate bearer using the source address of the internet packets. The TFT 19 can be established to recognise either an IPv6 address or an IPv4 address. Therefore once the UE has acquired the IPv6 address from the address allocation server 17, the UE informs the TFT in the GGSN 3, that the source address with which to identify the established bearer will be an IPv6 address.

In order to provide an arrangement whereby the user equipment UE can construct an address, referred to as a link-local address, in order to acquire an IPv6 address, a tunnelling end point identifier (TED) is required. Address construction is explained in the following section. More general information concerning the construction of IPv6 addresses is provided in Annex 1.

Figure 3A:
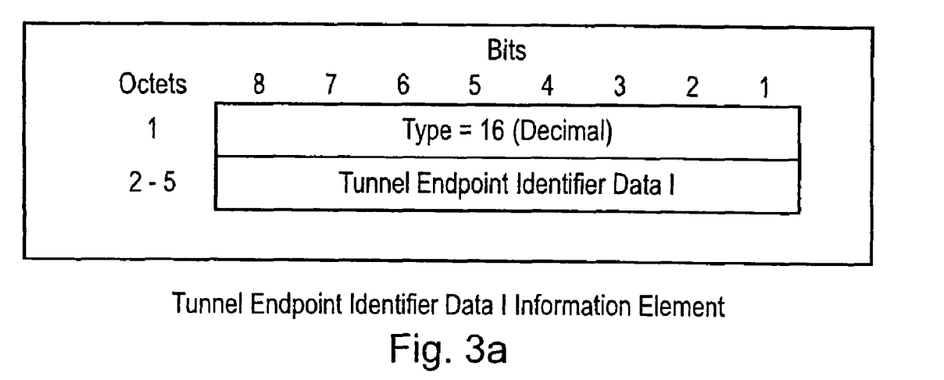
FIG. 3a is a diagram illustrating a tunnel end point identifier for data transmission.
Figure 3B:
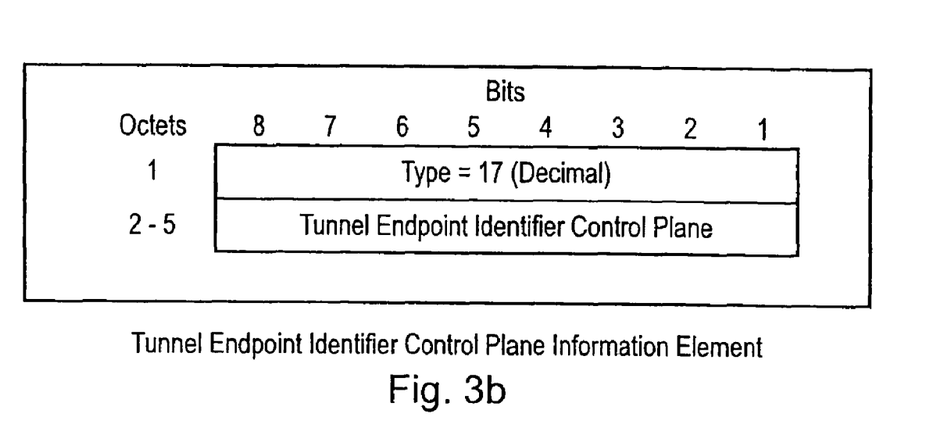
FIG. 3b is a corresponding diagram for control plane data.

2. Constructing the IPv6 Link Local Address for Tunnelling IPv6 packets across GPRS/UMTS The present technique utilises a tunnel end point identifier of a GPRS tunnelling protocol bearer to define an interface identifier from which an IPv6 link-local address can be formed. The interface identifier can be used to form an IPv6 compatible address which can be tunnelled automatically by the GPRS network and so is referred to as the GPRS Automatic Tunnelling (GAT) Interface ID. The GAT interface ID is defined using a GPRS Tunnelling Protocol Tunnel Endpoint Identifier which is defined as (TS29.060). The form of the TEID is shown in FIG. 3*a* for data transmission and FIG. 3*b* for control plane data.

Figure 4A:
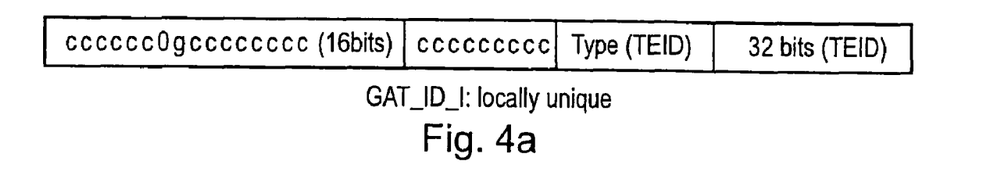
FIG. 4a schematically illustrates an address format for a first locally unique GAT ID (GAT_ID_I), and FIG. 4b schematically illustrates an address format for a first globally unique GAT ID (GAT_ID_I)
Figure 4B:
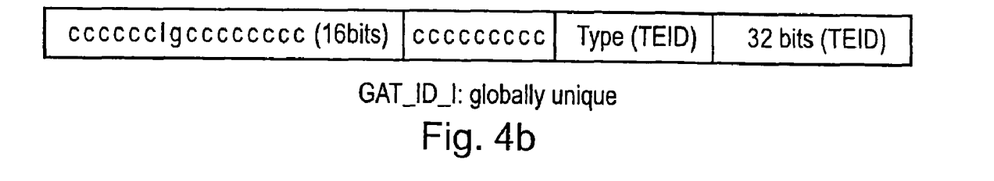
Figure 5:
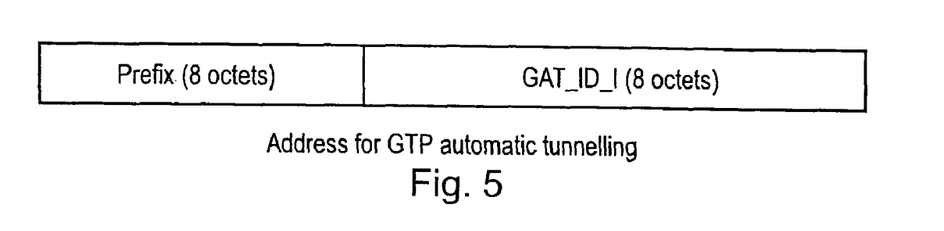
FIG. 5 schematically illustrates a general address format for GTP tunnelling.

An example of an interface identifier which can be used to form an address, which is compatible with IPv6 in accordance with IPv6 Addressing Architecture (RFC2373, Appendix A), uses the TEID in combination with a company identifier. The interface identifier has 64 bits and uses a Modified IEEE EUI-64 format. The TEID is used to construct the RFC2373 compliant Interface identifier. The address is constructed as shown in FIGS. 4*a* and 4*b*, where "c" is assigned to the company_id, and "g" is a field providing the individual/group significance. There are two forms of GAT_ID_I address, one is a local unique IEEE EUI-64 address as shown in FIG. 4*a*, and the other is a globally unique IEEE EUI-64 address as shown in FIG. 4*b*.

Transferring TEID's to UE'

So as to construct the interface ID, the UE must be informed of the TEID of the GTP bearer which is established by the GGSN. In "conventional" PDP Context Activation, the TEID is used for local use within the RNC, SGSN and the GGSN. Due to the need by the UE to construct the interface ID using the TEID, the TEID needs to be passed to the UE's. In a first example the TEID is passed to the UE directly. In this case the SGSN may choose to pass one or all three pairs of TEID (6 in total) to the UE using the Protocol Configuration Option (PCO) field in PDP Context Activation Accept.

In a second example the GGSN uses one of its TEID to construct an IPv6 link-local address according to its addressing policies and then passes it to the SGSN in the PCO field of the PDP Context Create Response Message. The SGSN in turn, pass this GGSN constructed IPv6 address to the UE using the PCO field of the PDP Context Activation Accept message.

The Formation of Link-Local Address

Figure 6:
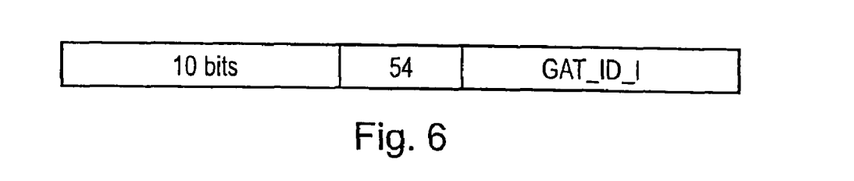
FIG. 6 schematically illustrates an address format for a link local address for GTP automatic tunnelling.

A more specific example of a link-local address is shown in FIG. 6. According to RFC2373, an IPv6 packet with site-local or link-local source or destination addresses must not be forwarded by routers outside of the site. These addresses are intended to be used for purposes such as automatic address configuration, neighbour discovery, or when no routers are present. The address of FIG. 6 can be used for intra-Public Land Mobile Network (PLMN) communications between UE's, i.e. the UE peers are located in the same PLMN and no packets are routed out via the Gi interface to PDN of FIG. 1.

3. Summary of Operation

Figure 7:
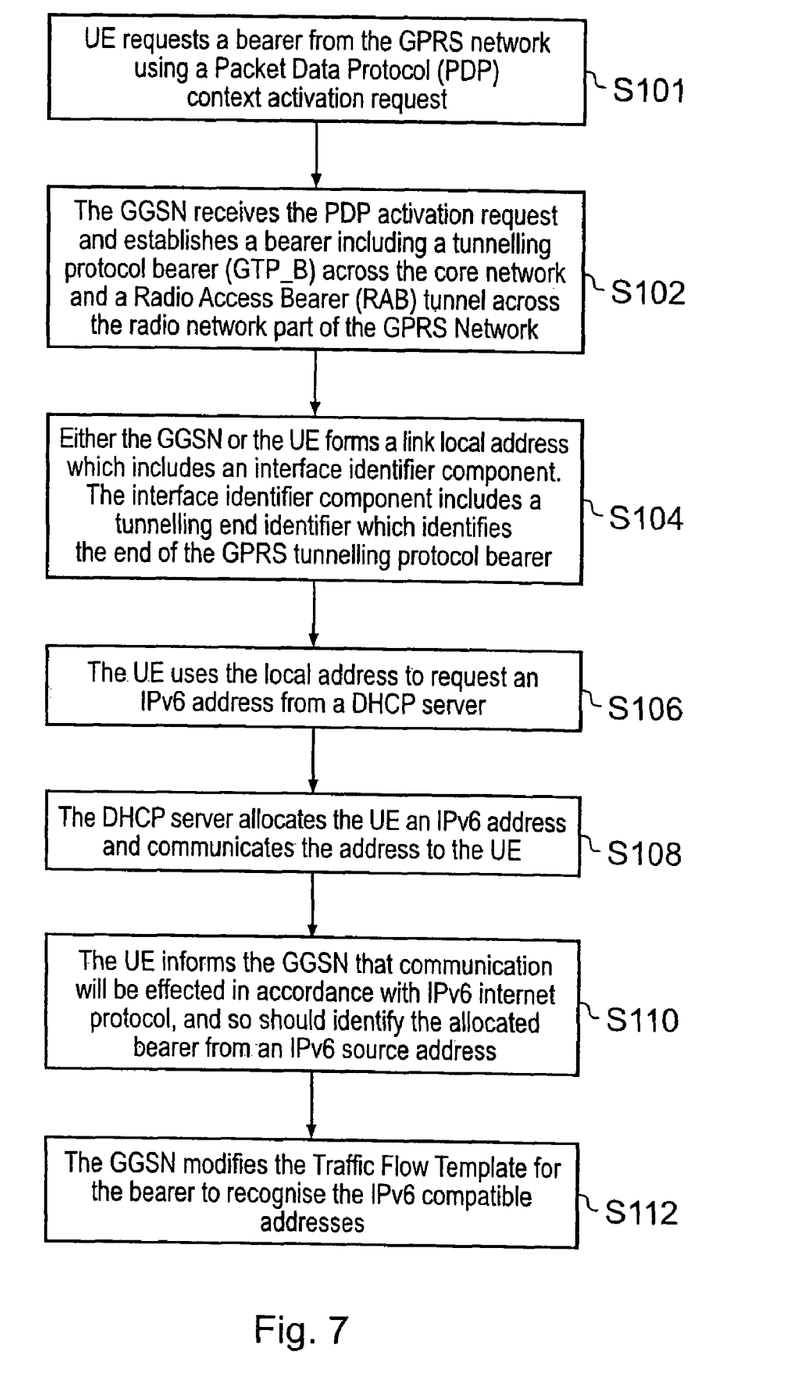
FIG. 7 is a flow diagram illustrating a process for forming a link local address and for communicating IPv6 internet packets from the UE to a correspondent node.

According to the present technique, the telecommunications system illustrated in FIGS. 1 and 2 operates to provide a link local address and uses the link local address to acquire an IPv6 address. The operations performed by the UE and the GGSN are summarised by the flow diagrams shown in FIGS. 7, 8 and 9. FIG. 7 provides an illustration of a general operation of the system, whereby the UE acquires an IPv6 address and the GGSN adapts the TFT to recognise the IPv6 compatible address. FIG. 7 is summarised as follows:

S101: UE requests a bearer from the GPRS network using a packet data protocol (PDP) context activation request.

S102: The GGSN then receives the PDP context activation requests and establishes a bearer including a GPRS Tunnelling Protocol (GTP) bearer across the core network part and a Radio Access Bearer (RAB) across the Radio Network part.

S104: Either the GGSN or the UE then forms a link local address, which includes an interface ID address component. The interface ID component includes a tunnelling end identifier (TEID which identifies the end of the GTP bearer as the bearer ends at the GGSN.

S106: The UE then uses the link local address to request an IPv6 address for example from a DHCPv6 server.

S108: The DHCPv6 server allocates the UE an IPv6 address and returns the IPv6 address to the UE.

S110: The UE informs the GGSN that communication will be effected in accordance with the IPv6 internet protocol. The GGSN should therefore identify the allocated bearer from an IPv6 source address.

S112: The UE initiates PDP Context Modification to modify the TFT at the GGSN for the bearer to recognise an IPv6 source address of the CN. Therefore, the TFT identifies the bearer for communicating internet packet data to the UE on the basis of a source address which is an IPv6 source address.

Figure 8:
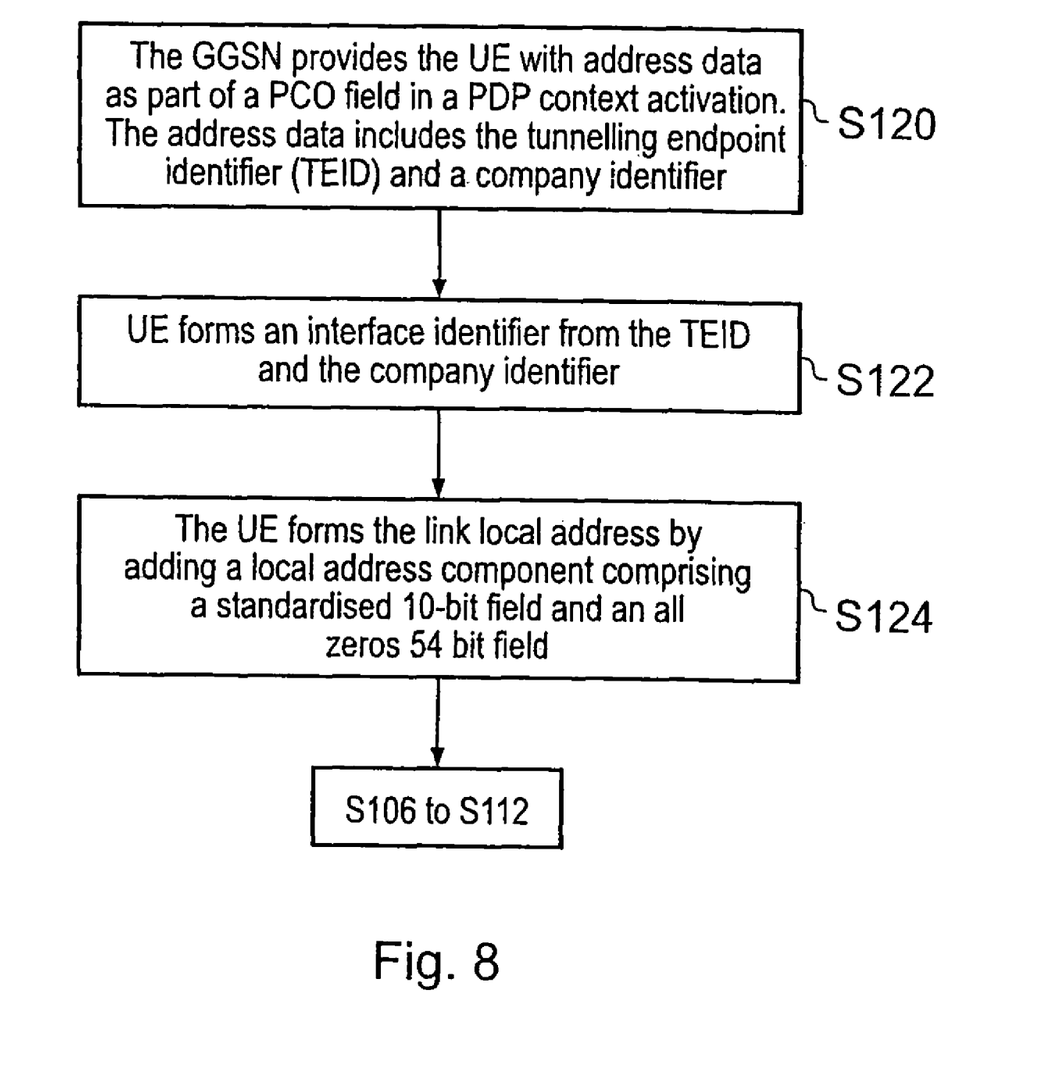
FIG. 8 is a flow diagram illustrating a process for forming the link local address in the process of FIG. 7.

An example of a process of forming the link local address as identified in step S104 in FIG. 7 is summarised by the flow diagram of FIG. 8. FIG. 8 is summarised as follows:

S120: The GGSN provides the UE with address data in the PCO field of a PDP context allocation. The address data includes the tunnelling end identifier and a company identifier.

S122: The UE then forms an interface ID component of the link local address (GAT-I) from the tunnelling identifier and the company identifier.

S124: The UE then forms the link local address from the interface ID and an address component which indicates that the address is a local address. The address component has a first field of 10-bits with a predetermined pattern according to an internet protocol IPv6 standard and a second field of 54 bits, which are set to all zeros.

S106 to S112: Processing then proceeds as shown in FIG. 7.

The UE can then use the IPv6 address to communicate via the allocated GTP and RAB tunnelling bearers. For up-link communications (UE to CN) the GGSN is not concerned with the internet protocol version. For down-link communications the GGSN is notified that the communications session is an IPv6 session and that therefore the internet packets received from the CN should be routed by the appropriate bearer, which is identified from the IPv6 source address of the CN.

Various further aspects and features of the present invention are defined in the appended claims. Various modifications can be made to the embodiments herein described without departing from the scope of the present invention. For example, although the above embodiments have been described for a first internet protocol as IPv6 and the second internet protocol (communication via the packet radio system network) as IPv4, in other embodiments the first protocol may be IPv4 and the second protocol (for communication via the packet radio system network) may be IPv6. Furthermore other internet protocols may be used for the first and second internet protocols.

4. Annex 1

IPv6 Addressing Schemes

These addressing schemes are summarised in more detail in RFC 3513 "Internet Protocol Version 6 (IPv6) Addressing Architecture".

IPv6 unicast addresses are agreeable with prefixes of arbitrary bit-length similar to IPv4 addresses under Classless Routing. There are several types of unicast addresses in IPv6, in particular, global unicast, site-local unicast, and link-local unicast. There are also some special purpose subtypes of global unicast, such as IPv6 addresses with embedded IPv4 address types or encoded NSAP addresses. Additional address types or subtypes can be defined in the future.

Figure 9:
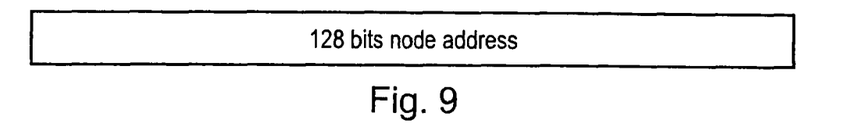
FIG. 9 is an example of a general format of an IPv6 address.
Figure 10:
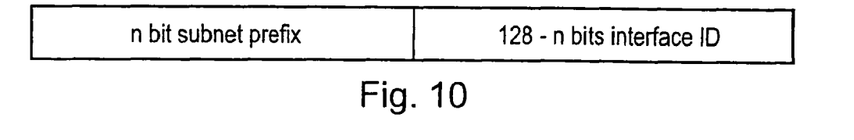
FIG. 10 is an example of an IPv6 address showing a sub-net prefix of n-bits.

IPv6 nodes may have considerable or little knowledge of the internal structure of the IPv6 address, depending on the role of the node plays (for instance, host versus router). At a minimum, a node may consider that unicast address (including its own) have no internal structure. An example of this is shown in FIG. 9. A slightly sophisticated host (but still rather simple) may additionally be aware of subnet prefix(s) for the link(s) it is attached to, where different addresses may have different values for the subnet prefix(s) which occupies the first n bits, as shown in FIG. 10. The address shown in FIG. 10 can be used to construct the IPv6 address, called the GAT address, for automatic tunnelling. The interface identifiers in IPv6 unicast addresses are used to identify interfaces on a link. They are required to be unique within a subnet prefix.

Constructing Interface ID of IPv6 Address

For all unicast addresses, except those that start with binary value 000 (the addresses using embedded IPv4 addresses), interface ID's are required to be 64-bits long and to be constructed in Modified EUI-64 format (IEEE, "Guidelines for 64-bit Global Identifier (EUI-64) Registration Authority"

http://standards.ieee.org/regauth/oui/tutorial/EUI64.html, March 1997).

Modified EUI-64 format based Interface identifiers may have global scope when derived from a global token (e.g. IEEE 802 48-bit MAC or IEEE EUI-64 identifiers) or may have local scope where a global token is not available (e.g. serial links, tunnel end-points, etc) or where global tokens are undesirable (e.g. temporary tokens for privacy).

Figure 11:
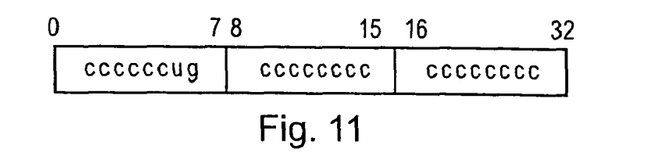
FIG. 11 is an example of a modified EUI-64 format interface identifier.

Modified EUI-64 format interface identifiers are formed by inverting the "u" bit (universal/local bit in IEEE EUI-64 terminology) when forming the interface identifier from IEEE EUI-64 identifiers. In the resulting Modified EUI-64 format the "u" bit is set to "1" to indicate the global scope, and it is set to "0" to indicate local scope. The first three octets in binary of an IEEE EUI-64 identifier are shown in FIG. 11. As shown in FIG. 11, the address has fields written in Internet standard bit-order, where "u" is the universal/local bit, "g" is the individual/group bit, and "c" are the bits of the company_id. Examples are provided in RFC3513.

When there is no specific built-in interface identifier is available such as the serial links or the configured tunnels (they are called links without identifiers), interface identifiers must be chosen that are unique within a subnet-prefix.

When no built-in identifier is available on a link the preferred approach is to use a global interface identifier from another interface or one which is assigned to the node itself.

When non global interface identifier is available for use on the link, it needs to create a local-scope interface identifier.

Global IPv6 Unicast Addresses

Figure 12:
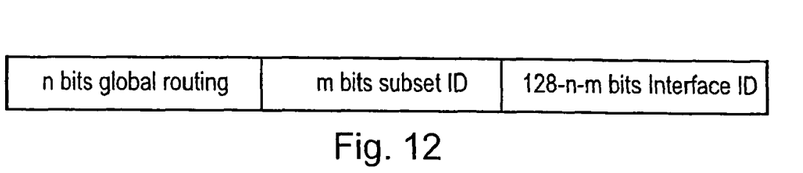
FIG. 12 is an example of a global uni-cast IPv6 address.

An example of a global IPv6 uni-cast address is shown in FIG. 12.

IPv6 Addresses with Embedded IPv4 Addresses

Figure 13:
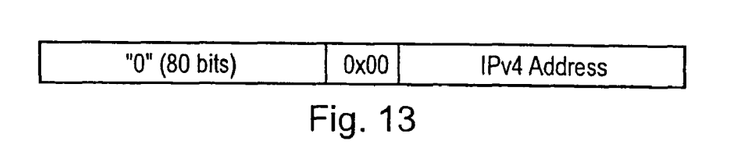
FIG. 13 is an example of an IPv6 address having an embedded IPv4 address.

To facilitate the IPv4 to IPv6 transition, a technique for hosts and routers to dynamically tunnel IPv6 packets over IPv4 routing infrastructure. IPv6 nodes that use this technique are assigned special IPv6 unicast address with an embedded global IPv4 address in the lower-order 32 bits. An example is shown in FIG. 13 which can be described as an "IPv4 compatible IPv6 address".

Figure 14:
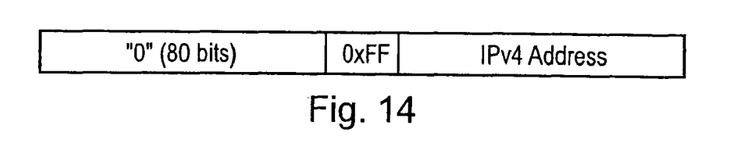
FIG. 14 is a second example of an IPv6 address having an embedded IPv4 address.

Another type of IPv4 address is called "IPv4-mapped IPv6 address" which has an address format as illustrated in FIG. 14. It can be used to represent the IPv4 nodes using IPv6 addresses.

Local-Use IPv6 Unicast Addresses

Figure 15:
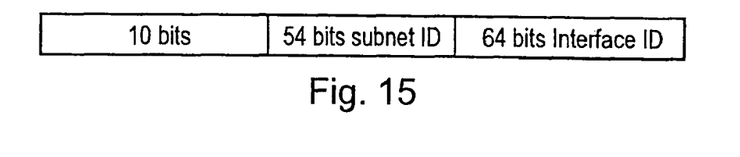
FIG. 15 is an example of a site local IPv6 address.
Figure 16:
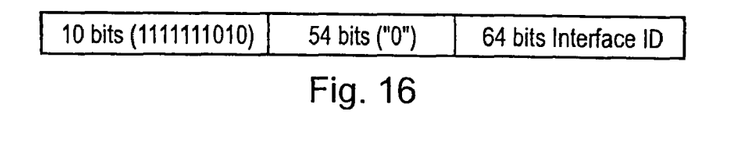
FIG. 16 is an example of a link local IPv6 address.

Two types of local use addresses are illustrated in FIGS. 15 and 16. These are a site-local address and a link-local address. Site local addresses are designed for addressing inside of a site without the need for a global prefix. The format of the site-local address is shown in FIG. 15.

The link-local address is designed for addressing on a single link for automatic address configuration, neighbour discovery, or when no routers are present. The format of the site-local address is shown in FIG. 16. There are other types of address such as Any-cast address, multicast address, loopback address, etc.

5. Annex 2

IPv4 UMTS Bearer Initiation Using PDP Context Activation

IP traffic (IPv6 or IPv4) is transported across the UMTS network (between UE and GGSN) across UMTS bearer. A UMTS bearer is described as the establishment of PDP (Packet Data Protocol) Context. A user equipment UE sends IPv4 or IPv6 packets across the UMTS network by setting up IPv4 PDP Context or IPv6 PDP Context. IPv6 PDP Contexts are only supported in a IPv6 capable UMTS network, specifically SGSN and GGSN as well as UE capable of supporting the IP6 related functions (routing, security) in its network protocol stack.

Figure 17:
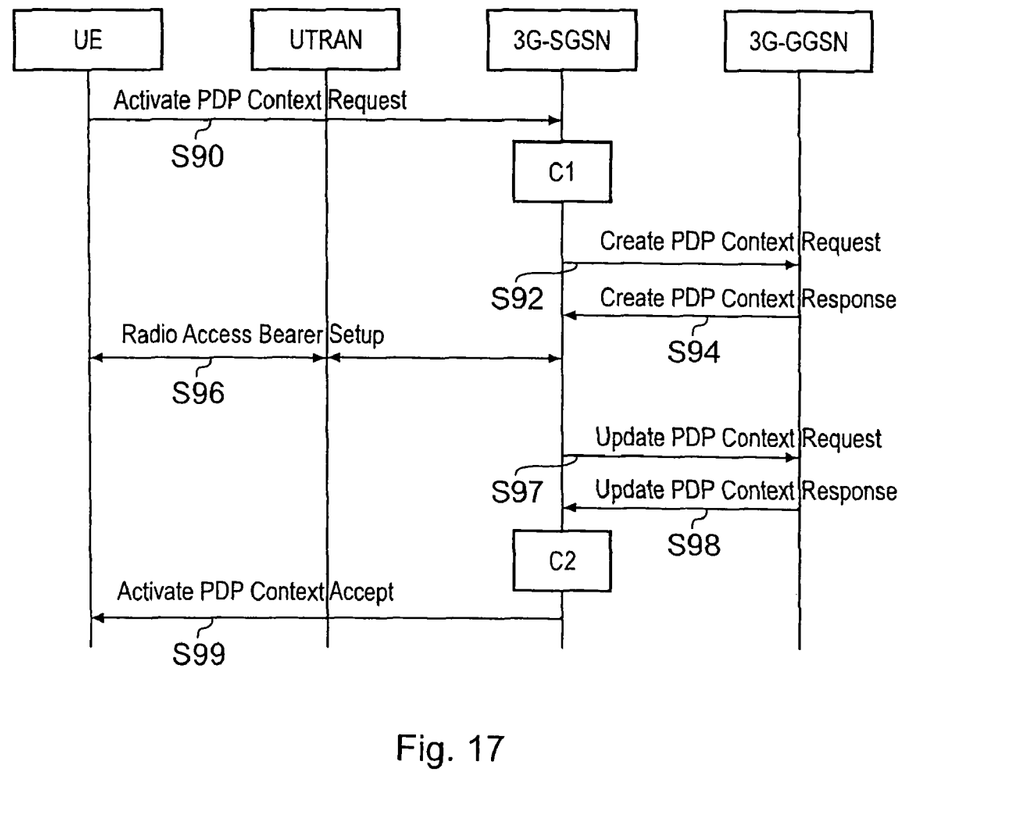
FIG. 17 is a flow diagram illustrating some of the process steps, which are required to establish a bearer for internet packets across a GPRS network.

An IPv4 only UMTS network will only support IPv4 PDP Context, although there is no explicit difference between the establishment procedures for IPv4 PDP Context and IPv6 PDP Context. Address management and security within a PDP Context activation are highlighted in the following summary with reference to a flow diagram in FIG. 17. The flow diagram of FIG. 17 represents equivalently IPv4 for IPv4 PDP Context and IPv6 for IPv6 PDP Context for an IPv6 capable UMTS.

S90: The user equipment UE sends an activate PDP Context Request (NSAPI, TI, PDP Type, PDP Address, Access Point Name, QoS Requested, PDP Configuration Options) message to the SGSN. The user equipment UE uses a PDP address to indicate whether it requires the use of a static PDP address or whether it requires the use of a dynamic PDP address. The user equipment UE leaves PDP address empty to request a dynamic PDP address.

S92: The SGSN validates the Activate PDP Context Request using PDP Type (optional), PDP Address (optional), and Access Point Name (optional) provided by the user equipment UE and the PDP context subscription records.

If no GGSN address can be derived or if the SGSN has determined that the Activate PDP Context Request is not valid according to the rules, the SGSN rejects the PDP context activation request.

If a GGSN address can be derived, the SGSN creates a TEID for the requested PDP context. If the user equipment UE requests a dynamic address, the SGSN lets a GGSN allocate the dynamic address. The SGSN may restrict the requested QoS attributes given its capabilities and the current load, and it shall restrict the requested QoS attributes according to the subscribed QoS profile.

The SGSN sends a Create PDP Context Request (PDP Type, PDP Address, Access Point Name, QoS Negotiated, TEID, NSAPI, MSISDN, Selection Mode, Charging Characteristics, Trace Reference, Trace Type, Trigger Id, OMC Identity, PDP Configuration Options) message to the affected GGSN . . . PDP Address shall be empty if a dynamic address is requested.

S94: The GGSN creates a new entry in its PDP context table and generates a Charging Id. The new entry allows the GGSN to route PDP PDUs between the SGSN and the external PDP network, and to start charging. The way the GGSN handles Charging Characteristics that it may have received from the SGSN is defined in 3G TS 32.015[4]. The GGSN then returns a Create PDP Context Response (TEID, PDP Address, PDP Configuration Options, QoS Negotiated, Charging Id, and Cause) message to the SGSN. PDP Address is included if the GGSN allocated a PDP address. If the GGSN has been configured by the operator to use External PDN Address Allocation for the requested APN, PDP Address shall be set to 0.0.0.0, indicating that the PDP address shall be negotiated by the user equipment UE with the external PDN after completion of the PDP Context Activation procedure. The GGSN shall relay, modify and monitor these negotiations as long as the PDP context is in ACTIVE state, and use the GGSN-Initiated PDP Context Modification procedure to transfer the currently used PDP address to the SGSN and the user equipment UE. PDP Configuration Options contain optional PDP parameters that the GGSN may transfer to the user equipment UE. These optional PDP parameters may be requested by the user equipment UE in the Activate PDP Context Request message, or may be sent unsolicited by the GGSN. PDP Configuration Options is sent transparently through the SGSN. The Create PDP Context messages are sent over the backbone network.

S 96: A radio access bearer is set-up in accordance with the PDP activation, including QoS negotiation. The PDP context request is then updated (S97) from the SGSN to the GGSN and the GGSN responds to the update (S98).

S 99: If the user equipment UE has requested a dynamic address, the PDP address received from the GGSN is inserted in the PDP context. The SGSN selects Radio Priority and Packet Flow Id based on QoS Negotiated, and returns an Activate PDP Context Accept (PDP Type, PDP Address, TI, QoS Negotiated, Radio Priority, Packet Flow Id, PDP Configuration Options) message to the user equipment UE. The SGSN is now able to route PDP PDUs between the GGSN and the user equipment UE, and to start charging. NSAPI (together with TI) is used to distinguish secondary PDP Contexts.

6. References

[1] RFC 2893
[2] RFC2766 using SIIT (RFC 2765))
[3] R. Steele, C-C Lee and P. Gould, "GSM, cdmaOne and 3G Systems," published by Wiley International ISBN 0 471 491853
[4] 3G TS 32.015
[2] 3GPP TS 26.202 V5.1.0 (2002-09)
[3] 3GPP TS 23.107

The invention claimed is:

1. A telecommunications system for communicating internet packet data in accordance with a first internet protocol via a packet radio network operable in accordance with a second internet protocol, the system comprising
  a user equipment operable to request a bearer for communicating internet protocol data according to the second internet protocol to and from a gateway support node of the packet radio network,
  the gateway support node being operable to establish a tunnelling protocol bearer for communicating the internet packet data to and from the user equipment across the packet radio network, wherein the user equipment is operable in combination with the gateway support node
  to form a link local address comprising
  an interface identifier including a tunnelling end identifier of the tunnelling protocol bearer which ends at the gateway support node of the core network part of the packet radio network,
  an address component which identifies the address as being local to the packet radio network according to the first internet protocol,
  to communicate a request for an internet protocol address according to the first internet protocol to an address allocation server using the link local address,
  to receive an allocated internet protocol address according to the first internet protocol, and
  to communicate using the allocated internet protocol address.

2. The telecommunications system as claimed in claim 1, wherein the user equipment is operable in combination with the gateway support node
  to replace the link local address with the allocated address which is compliant with the first internet protocol, and
  to use the allocated address as a source address for communicating internet packet data to a correspondent node.

3. The telecommunications system as claimed in claim 2, wherein the user equipment is operable
  to inform the gateway support node that the internet packet data is to be communicated using the allocated address, source and destination addresses of the interne packet data being in accordance with the first internet protocol, the gateway support node being operable
  to adapt a traffic flow template to identify the established bearer from a source address which is in accordance with the first internet protocol.

4. The telecommunications system as claimed in claim 2, wherein the interface identifier of the link local address formed by the user equipment in combination with the gateway support node includes a company identifier indicative of an operator of the packet radio network.

5. The telecommunications system as claimed in claim 1, wherein the user equipment is operable
  to inform the gateway support node that the internet packet data is to be communicated using the allocated address, source and destination addresses of the internet packet data being in accordance with the first internet protocol, the gateway support node being operable
  to adapt a traffic flow template to identify the established bearer from a source address which is in accordance with the first internet protocol.

6. The telecommunications system as claimed in claim 5, wherein the interface identifier of the link local address formed by the user equipment in combination with the gateway support node includes a company identifier indicative of an operator of the packet radio network.

7. The telecommunications system as claimed in claim 1, wherein the interface identifier of the link local address formed by the user equipment in combination with the gateway support node includes a company identifier indicative of an operator of the packet radio network.

8. The telecommunications system as claimed in claim 1, wherein the local address component of the link local address includes a field, which indicates that, the address is a link local address according to the first internet protocol.

9. The telecommunications system as claimed in claim 8, wherein the local address component includes a first field of ten bits having a value which indicates that the address can be forwarded to routers and a second field of 45-bits which are set to zero.

10. The telecommunications system as claimed in claim 1, wherein the gateway support node is operable to form the link local address in the gateway support node using the tunnelling end identifier, and to communicate the internet protocol address to the user equipment.

11. The telecommunications system as claimed in claim 1, wherein the gateway support node is operable
   to communicate to the user equipment with information identifying the allocated bearer, address data, the address data including the tunnelling end identifier of the tunnelling protocol bearer, the user equipment being operable
   to form the link local address using the tunnelling end identifier provided to the user equipment as part of the address data.

12. The telecommunications system as claimed in claim 11, wherein the address data includes the company identifier, the user equipment being operable to form the link local address according to the first internet protocol from the company identifier in combination with the tunnelling end identifier.

13. The telecommunications system as claimed in claim 12, wherein gateway support node is operable to provide the address data including the tunnelling end identifier using a protocol configuration option field of the packet data protocol context acceptance.

14. The telecommunications system as claimed in claim 1, wherein the packet radio network operates in accordance with the General Packet Radio Service.

15. A method of communicating internet packet data in accordance with a first internet protocol, via a packet radio network operable in accordance with a second internet protocol, the method comprising
   requesting a bearer for communicating internet protocol data between a gateway support node of the packet radio network and the user equipment,
   establishing a tunnelling protocol bearer for communicating the internet packet data to and from the user equipment across the packet data network,
   forming a link local address comprising
   an interface identifier including a tunnelling end identifier of the tunnelling protocol bearer which ends at the gateway support node of the core network part of the packet radio network, and
   an address component which identifies the address as being local to the packet radio network according to the first internet protocol,
   communicating a request for an internet protocol address according to the first internet protocol to an address allocation server using the link local address,
   receiving an allocated internet protocol address according to the first internet protocol, and
   communicating using the allocated internet protocol address.

16. The method as claimed in claim 15, wherein the forming the internet protocol address using the allocated address comprises
   replacing the link local address with the allocated address which is compliant with the first internet protocol, and
   using the allocated address as a source address for communicating internet packet data to a correspondent node.

17. The method as claimed in claim 16, comprising
   informing the gateway support node that the internet packet data is to be communicated using the allocated address, the source address and a destination address of the internet packet data being in accordance with the first internet protocol, and
   adapting a traffic flow template to identify the established bearer from a source address which is in accordance with the first internet protocol.

18. The method as claimed in claim 16, wherein the forming the link local address includes
   forming the interface identifier of the link local address with a company identifier indicative of an operator of the packet data network.

19. The method as claimed in claim 15, comprising
   informing the gateway support node that the internet packet data is to be communicated using the allocated address, the source address and a destination address of the internet packet data being in accordance with the first internet protocol, and
   adapting a traffic flow template to identify the established bearer from a source address which is in accordance with the first internet protocol.

20. The method as claimed in claim 19, wherein the forming the link local address includes
   forming the interface identifier of the link local address with a company identifier indicative of an operator of the packet data network.

21. The method as claimed in claim 15, wherein the forming the link local address includes
   forming the interface identifier of the link local address with a company identifier indicative of an operator of the packet data network.

22. The method as claimed claim 15, wherein the forming the link local address includes
   forming the local address component of the link local address with a field, which indicates that, the address is a link local address according to the first internet protocol.

23. The method as claimed in claim 22, wherein the forming the local address component comprises
   forming the link local address component with a first field of ten bits having a value which indicates that the address can be forwarded to routers and a second field of 45-bits which are set to zero.

24. The method as claimed in claim 15, comprising
   communicating to the user equipment with information identifying the allocated bearer, address data, the address data including the tunnelling end identifier of the tunnelling protocol bearer, and
   forming the link local address using the tunnelling end identifier provided to the user equipment as part of the address data.

25. The method as claimed in claim 24, wherein the address data includes the company identifier, the forming the link local address comprising
   forming the link local address from the company identifier in combination with the tunnelling end identifier.

26. The method as claimed in claim 25, wherein the providing the address data comprises
   using a protocol configuration option field of the packet data protocol context acceptance to provide the address data including the tunnelling end identifier.

27. A method as claimed in claim 15, wherein the packet radio network operates in accordance with the General Packet Radio Service.

28. A non-transitory medium bearing the computer program providing computer executable instructions which when loaded on to a computer, causes the computer to perform the method according to claim 15.

29. An apparatus for communicating internet packet data in accordance with a first internet protocol, via a packet radio network operable in accordance with a second internet protocol, the apparatus comprising
- means for requesting a bearer for communicating internet protocol data between a gateway support node of the packet radio network and the user equipment,
- means for establishing a tunnelling protocol bearer for communicating the internet packet data to and form the user equipment across the packet data network,
- means for forming a link local address comprising
  - an interface identifier means including a tunnelling end identifier of the tunnelling protocol bearer which ends at the gateway support node of the core network part of the packet radio network, and
  - an address component means which identifies the address as being local to the packet radio network according to the first internet protocol,
- means for communicating a request for an internet protocol address according to the first internet protocol to an address allocation server using the link local address,
- means for receiving an allocated internet protocol address according to the first internet protocol, and
- means for communicating using the allocated internet protocol address.

* * * * *